Oct. 31, 1944.                C. J. LANZINGER                2,361,484
                              ANNEALING TUMBLER
                            Filed May 19, 1942
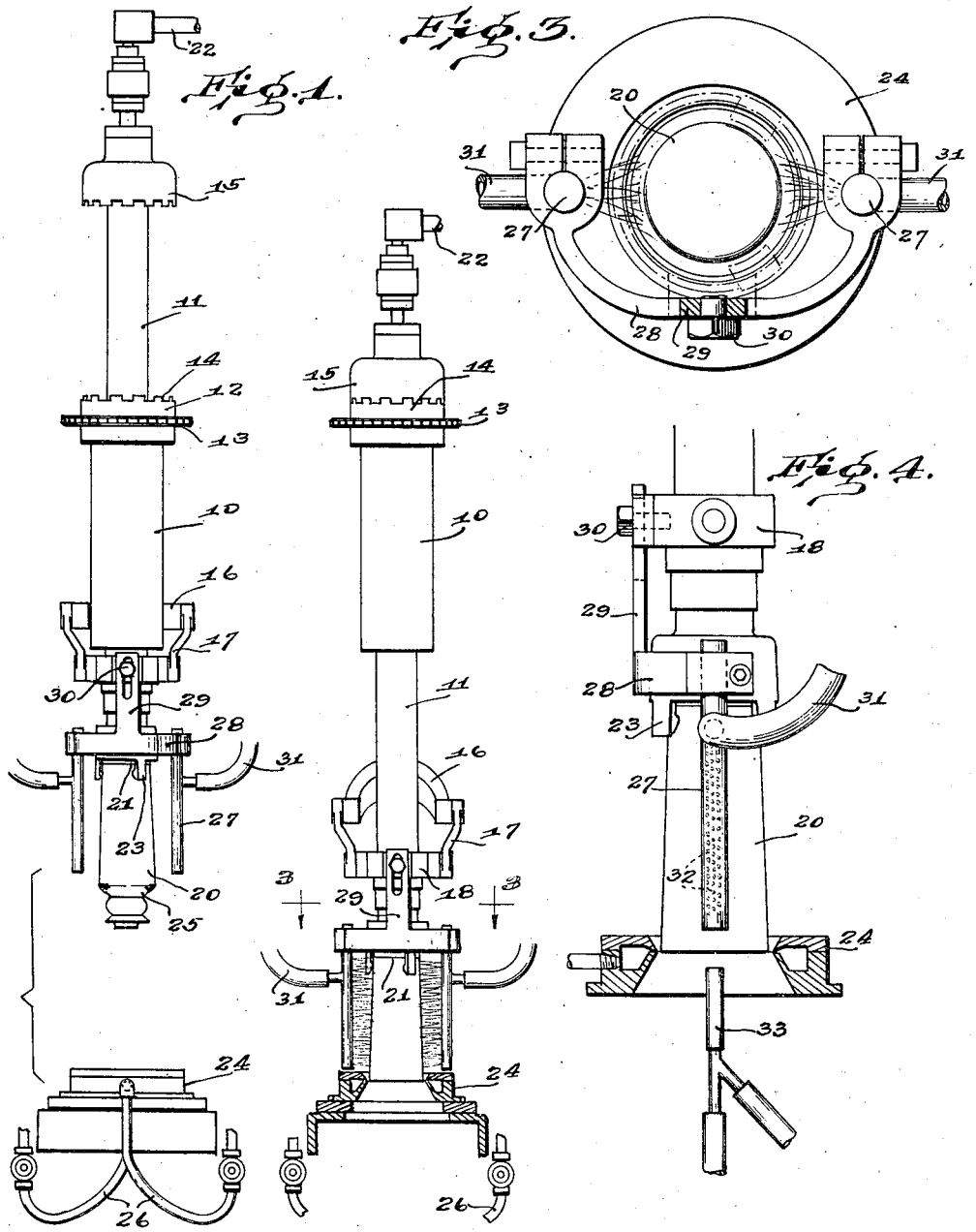
C. J. Lanzinger
INVENTOR
BY Rule & Hoge,
ATTORNEYS Patented Oct. 31, 1944

2,361,484

UNITED STATES PATENT OFFICE 2,361,484

ANNEALING TUMBLERS

Casper J. Lanzinger, Toledo, Ohio, assignor, by mesne assignments, to Owens-Illinois Glass Company, Toledo, Ohio, a corporation of Ohio Application May 19, 1942, Serial No. 443,552

6 Claims. (Cl. 49—58)

My invention relates to a method and apparatus for use in the manufacture of glassware such as tumblers and other hollow articles. In the manufacture of tumblers and like articles it is common practice to gather gobs or mold charges of molten glass, attach them to blow pipes or tubular spindles, blow the charges to hollow form and complete the blowing and shaping of the articles in finishing molds while still attached to the spindles. Thereafter the blown articles are introduced into chucks and the moils or waste ends are detached by means of annular burners. The tumblers are then introduced into a leer and reheated for removing or reducing the strains introduced during the forming operations and then gradually cooled to room temperature. Such annealing requires a considerable length of time, particularly for gradually cooling the article after it has been brought to an annealing temperature.

An object of the present invention is to provide a novel method and apparatus by which the blown articles are heated for removing the forming stresses concomitantly with the burning-off operations by which the moils are severed. The articles after being thus heated may be cooled comparatively rapidly. A further object attained by such operation is to introduce a certain amount of surface tension or strain in the article by which it is materially strengthened. I have found that with such a method a tumbler or like article is made much stronger and much more resistant to shocks and mechanical injuries generally than when annealed by the usual method.

A further object attained by the present method and apparatus is the elimination of the usual annealing apparatus, as a comparatively simple apparatus may be used for regulating the process of cooling the ware after the moils have been severed, and the usual reheating of the ware in a leer is also rendered unnecessary.

Other objects of the invention will appear hereinafter.

Referring to the accompanying drawing which illustrates a preferred form of apparatus for use in practicing my invention:

Fig. 1 is an elevation of the apparatus which includes a burn-off mechanism and reheating burners for heating the work-piece during the burn-off operation;

Fig. 2 is a part sectional view of the same, the parts being in a different relative position;

Fig. 3 is a section substantially at the line 3—3 on Fig. 2; and

Fig. 4 is a fragmentary part sectional view showing the ring burner and the reheating means.

The burn-off mechanism as herein shown is in the main of conventional construction and operation such as disclosed in the patent to Parker 1,757,211, May 6, 1930, Rotary burn-off machines, to which patent reference may be had for a full disclosure of the apparatus for severing the moil.

The apparatus herein shown may form one unit of a rotary burn-off machine such as disclosed in the said Parker patent. As shown in the accompanying drawing this unit includes a vertically disposed tubular bearing 10 through which extends a tubular spindle 11 mounted for up and down movement and also for rotation within the bearing 10. Mounted for rotation on the bearing 10 is a ring 12 which carries a chain driven sprocket gear 13. The ring 12 also serves as a clutch member, being formed with clutch teeth 14, to cooperate with a clutch member 15 attached to the upper end of the spindle 11. The spindle is adapted to be lifted and lowered by means of a rock arm having a bifurcated end 16 connected through links 17 to a collar 18 on the lower end of the spindle. The arm 16 is periodically moved up and down for lifting the spindle to the Fig. 1 position and for lowering it to the Fig. 2 position in which the clutch members are engaged, permitting the spindle to be rotated. The spindle is free for rotation within the collar 18 but the latter is held against movement lengthwise of the spindle.

The work-piece 20, herein shown as a tumbler, is held by a chuck 21 secured to the lower end of the spindle 11. The work-piece is held in the chuck by means of suction applied in a conventional manner through a vacuum line 22 including the tubular spindle 11. The work-piece is centered in the chuck by means of arms 23. When a work-piece has been placed in the chuck the spindle 11 is lowered thereby bringing the lower end of the work-piece into the ring burner 24 which applies a localized annular flame of intense heat by which the moil 25 is severed and drops away from the work-piece. Fuel gas and air or oxygen are supplied to the burner through pipes 26.

The parts thus far described are largely conventional as shown for example in the above mentioned Parker patent. In accordance with the present invention there is provided means for heating the entire work-piece to a sufficiently high temperature to remove the strains introduced during the forming operations. Such reheating may take place simultaneously or concurrently with the operation of the burners 24, or at any time while the work-piece is supported in the chuck. The reheating means includes a pair of pipes 27 mounted in a yoke 28 formed with a vertical arm 29. The arm is attached to the collar 18 by a bolt 30 which extends through an elongated slot in said arm thereby permitting vertical adjustment of the yoke 28 and burners 27. Fuel gas is supplied to the burners 27 through pipes 31. The burners 27 are positioned at opposite sides of the work-piece while the latter is held in the chuck and are formed on their inner faces with a multiplicity of jet openings 32 through which the jets of flame issue and play on the surface of the work-piece. The burners may be substantially coextensive in length with the work-piece. The surface of the work-piece which rotates between the burners 27 is thus uniformly heated throughout while the moil is being burned off by the burner 24. A burner 33 (Fig. 4) is positioned and arranged to project a heating flame upward within the work-piece for heating the inner surface thereof. The burner 33 may be brought into position after the moil has been severed. The entire reheating operations by the burners 27 and 33 may take place if desired after the ring burner 24 has severed the moil.

After the work-piece has been thus reheated it may be cooled comparatively quickly in the open or in a short leer or compartment in which the temperatures may be controlled. When the articles are introduced into such leer or the like, they may be subjected to a temperature above that of the atmosphere and then to progressively lower temperatures. It has been found unnecessary however to further reheat the ware after the above described heating operations by the burners 27 and 33. The article may be cooled comparatively quickly, producing a certain surface tension on the ware by which the articles are greatly strengthened and made more resistant to shocks as compared with ware annealed in the usual manner.

Modifications may be resorted to within the spirit and scope of my invention.

I claim:

1. The combination of a chuck for holding the bottom end of a glass tumbler, an annular burner comprising means for applying an annular flame to the tumbler adjacent the opposite end thereof for burning-off a waste portion of the glass, and means for reheating the tumbler as a whole during said burning-off operation, said reheating means comprising a pipe in position to extend along the side of the tumbler while the latter is held on the chuck, said pipe having a multiplicity of jet openings distributed therealong in position to direct jets of flame against the side walls of the tumbler throughout its length from the chuck to the said annular burner.

2. The combination of a rotary spindle, a chuck carried by said spindle for holding a tumbler or like article, an annular burner for burning off a moil from the said article, means for rotating the spindle and the attached article during the burn-off operation, and reheating burners comprising pipes positioned to extend along opposite sides of the article for reheating it while held in the chuck, said pipes each having a multiplicity of jet openings distributed therealong in position to direct jets of flame against the side walls of the tumbler and thereby applying a substantially continuous flame to the tumbler from the chuck to the said annular burner.

3. The combination of a vertical spindle, a chuck on the lower end of the spindle for holding the bottom end of an inverted tumbler, the opposite end of which has a waste portion of glass integral therewith, an annular burner arranged concentrically with the spindle and positioned below said chuck, means for effecting a relative vertical movement of the spindle and burner by which the latter is positioned to surround the tumbler for burning-off said waste glass, means for rotating the spindle during said burning-off operation, and a stationary burner positioned for heating the tumbler as a whole to a substantially uniform high temperature while held in said chuck, said stationary burner comprising a yoke partly surrounding the chuck, a pair of pipes extending downward from the yoke on opposite sides of the tumbler, each said pipe being provided with a multiplicity of closely spaced jet openings aranged along the pipe in position to direct jets of flame inwardly against the surface of the tumbler throughout the length of the tumbler.

4. The combination of a spindle, a chuck carried thereby for gripping a hollow glass article, means for rotating the spindle and thereby rotating the article, an annular burner, means for positioning the burner to surround the article while the latter is being rotated, means for reheating the entire article comprising burner pipes positioned to extend along the outer surfaces of the article while the latter is being rotated and each having a multiplicity of jet openings arranged along the pipe in position to direct jets of flame against the said surface throughout the length of the article from the chuck to the annular burner, and means for applying a reheating flame within the article while supported in the chuck.

5. The combination of a vertical tubular spindle, a chuck carried on the lower end of the spindle, means for applying suction through the spindle to the chuck and thereby holding an inverted tumbler in the chuck, a ring burner, beneath the chuck, means for lowering and lifting the spindle to and from a position in which the burner surrounds the mouth end of an inverted tumbler held in the chuck, and a reheating burner mounted for up and down movement with the spindle and comprising a pipe in position to extend along the side of the tumbler and having jet openings positioned to apply a heating flame to the side wall surface of the tumbler throughout the length of the tumbler while the latter is held in the chuck and thereby reheating the tumbler during its rotation with the spindle.

6. The combination of a vertical tubular spindle, a chuck carried on the lower end of the spindle, means for applying suction through the spindle to the chuck and thereby holding an inverted tumbler in the chuck, a ring burner beneath the chuck, means for lowering and lifting the spindle to and from a position in which the burner surrounds the mouth end of an inverted tumbler held in the chuck, a reheating burner mounted for up and down movement with the spindle and comprising a pipe in position to extend along the side of the tumbler and having jet openings positioned to apply a heating flame to the side wall surface of the tumbler throughout the length of the tumbler while the latter is held in the chuck and thereby reheating the tumbler during its rotation with the spindle, and a burner positioned beneath said ring burner and arranged to project a heating flame into the inverted tumbler.

CASPER J. LANZINGER.